United States Patent [19]

Huang et al.

[11] 3,841,903
[45] Oct. 15, 1974

[54] PROCESS FOR PRODUCING PAPER-LIKE SYNTHETIC RESIN FILM

[75] Inventors: Ching Yun Huang; Rokuro Fujita, both of Osaka, Japan

[73] Assignee: Japan Gas-Chemical Company, Inc., Tokyo, Japan

[22] Filed: Feb. 13, 1973

[21] Appl. No.: 332,166

Related U.S. Application Data

[63] Continuation of Ser. No. 114,612, Feb. 11, 1971, abandoned.

[30] Foreign Application Priority Data

Feb. 16, 1970 Japan............................ 45-12610

[52] U.S. Cl............. 117/138.8 F, 117/63, 117/72, 117/138.8 N, 117/138.8 UA, 117/138.8 PV, 117/138.8 E, 117/161
[51] Int. Cl............................ B44d 1/44, B44d 5/04
[58] Field of Search............. 117/138.8 N, 138.8 F, 138.8 E, 117/138.8 UA, 138.8 A, 138.8 PV, 161 UZ, 161 UC, 161 UN, 161 UT, 36.7, 119.6, 72

[56] References Cited
UNITED STATES PATENTS

| | | | |
|---|---|---|---|
| 3,062,674 | 11/1962 | Houck et al. | 117/34 |
| 3,350,205 | 10/1967 | Goffe | 96/35.1 |
| 3,515,567 | 6/1970 | Tani et al. | 117/11 |
| 3,551,525 | 12/1970 | Wilhelm et al. | 260/881 |
| 3,585,063 | 6/1971 | Remmington | 117/47 |
| 3,620,806 | 11/1971 | Kohne et al. | 117/63 |
| 3,644,139 | 2/1972 | Schwarz | 117/118 |
| 3,653,938 | 4/1972 | Obuchi et al. | 117/15 |
| 3,704,154 | 11/1972 | Tatsuta et al. | 117/34 |

FOREIGN PATENTS OR APPLICATIONS 966,656   8/1964   Great Britain

*Primary Examiner*—Leon D. Rosdol
*Assistant Examiner*—P. E. Willis
*Attorney, Agent, or Firm*—Wenderoth, Lind & Ponack

[57] ABSTRACT

Paper-like film having superior whiteness, appearance and feel resembling those of pulp paper, and superior printability is produced by a process comprising dissolving a copolymer of at least one ethylenically unsaturated monomer (A) having a hydrophilic group such as acrylic acid, with at least one ethylenically unsaturated monomer (B) copolymerizable therewith and having a small hydrophilicity, such as styrene or methyl acrylate, in an organic solvent, such as methanol or methyl ethyl ketone, which substantially uniformly dissolves said copolmer and is compatible with water, coating the resulting solution on a synthetic resin substrate film. and drying the coated synthetic resin film at least 10° C. and an RH of at least 50 percent, thereby to whiten said copolymer coated.

10 Claims, 1 Drawing Figure

PATENTED OCT 15 1974 3,841,903
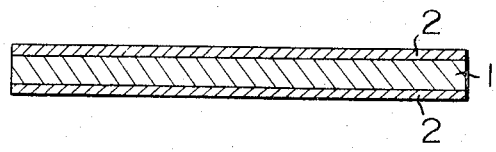
CHING YUN HUANG and
ROKURO FUJITA, Inventors
By *Wenderoth, Lind & Ponack*
Attorneys

PROCESS FOR PRODUCING PAPER-LIKE SYNTHETIC RESIN FILM

This is a continuation of application Ser. No. 114,612, filed Feb. 11, 1971, now abandoned.

This invention relates to a process for producing a paper-like synthetic resin film which comprises coating a solution of a polymer on the surface of a synthetic resin film and drying the coated film under specific conditions thereby to form a white coating layer on the surface of said film.

Various methods have been proposed in recent years for imparting paper-like properties to a synthetic resin film, and the products have attracted attention as synthetic paper which replaces pulp paper. Generally, synthetic resin films are transparent or opaque unless subjected to various treatments. Among the methods proposed to make them paper-like are (1) methods of treating the surface of a synthetic resin film, such as treating its surface with a solvent or chemicals and coating other synthetic resins or a pigment with a binder on its surface, and (2) methods of treating the internal part of the film, such as incorporating a plasticizer, a filler, a pigment or a blowing agent in a synthetic resin to form it into a film and stretching the film biaxially. The products obtained by these methods suffer from various defects such as a reduction in strength, poor appearance and feel, poor whiteness and non-transparency, or poor working efficiency at cutting or printing, and have not proved satisfactory.

It has now been found that a synthetic paper of excellent paper properties can be obtained by coating a solution of a copolymer containing an ethylenically unsaturated monomer with a hydrophilic group in a solvent compatible with water on a synthetic resin film, and drying the coated film in an atmosphere of a specific humidity, thereby to effectively whiten the coating layer of the film.

The present invention provides a process for producing a paperlike film which comprises dissolving a copolymer of at least one ethylenically unsaturated monomer (A) having a hydrophilic group with at least one ethylenically unsaturated monomer (B) copolymerizable with said monomer (A) and having a hydrophobic group or a group having small hydrophilicity, in a solvent which substantially uniformly dissolves said copolymer and is compatible with water, and coating the resulting solution on a synthetic resin film; and drying the coated synthetic resin film in an atmosphere having a temperature of at least 10° C. and a relative humidity of at least 50 percent, thereby to whiten said copolymer coated.

The copolymer which forms a coating layer in the present invention is obtained by copolymerizing at least one ethylenically unsaturated monomer (A) having a hydrophilic group with at least one other ethylenically unsaturated monomer (B) copolymerizable with said monomer (A) and having a hydrophobic group or a group having small hydrophilicity in the presence of a polymerization initiator. Suitable examples of the hydrophilic group include a carboxyl group, carboxylic anhydride group, hydroxyl group, carbamoyl group, amino group, and ammonium salt group including an inorganic or organic acid salt of basic nitrogen, and a quaternary ammonium salt of basic nitrogen, methoxy group, or methyl carbonyl group.

Suitable examples of the ethylenically unsaturated monomers having the aforementioned hydrophilic group are:
i. ethylenically unsaturated carboxylic acids, such as acrylic acid, methacrylic acid, crotonic acid, maleic acid, fumaric acid, itaconic acid, or vinyl acetic acid;
ii. anhydrides thereof, such as maleic anhydride;
iii. amides thereof, such as acrylamide and methacrylamide;
iv. N-methylol amides thereof, such as N-methylol acrylamide and N-methylol methacrylamide;
v. hydroxyalkyl esters thereof, such as $\beta$-hydroxyethyl acrylate, $\beta$-hydroxypropyl acrylate, $\beta$-hydroxyethyl methacrylate, and $\beta$-hydroxypropyl methacrylate;
vi. aminoalkyl esters thereof, such as $\beta$-aminoethyl acrylate, $\beta$-aminoethyl methacrylate, mono- or dialkylaminoethyl acrylates, and mono- or di-alkyl amino ethyl methacrylates.

In addition to the aforementioned ethylenically unsaturated carboxylic acids and derivatives thereof, methyl vinyl ether, methyl vinyl ketone, vinyl pyrrolidone, vinyl carbazole, vinyl imidazole, N,N-dialkylvinyl amine, vinyl pyridine, ar-vinyl benzylamine and its N-alkyl or N,N-dialkyl derivatives can also be used.

Of these monomers, those having an amino group have basic nitrogen which forms an acid salt or a quaternary ammonium salt in the molecule and gives a group having very large hydrophilicity. Accordingly, copolymers in the form of salt which are obtained by reacting an acid or a quaternizing agent with copolymers having the said monomers as components, or using the said monomer in the form of a salt as one component of the copolymer are among those conveniently used in the present invention. Copolymers containing polymerized vinyl alcohol units such as the hydrolysis products of copolymers containing vinyl acetate in the monomers have large hydrophilicity, and fall within the range of the copolymers used in the invention to form a coating layer.

The copolymers which are particularly conveniently used in the present invention are listed below in the order of importance;
  copolymers of ethylenically unsaturated carboxylic acids, particularly acrylic acid, methacrylic acid, or maleic acid;
  copolymers of N-methylol amides of said unsaturated carboxylic acids; and
  copolymers of $\beta$-hydroxyalkylesters of said unsaturated carboxylic acids.

As the comonomer (B), any ethylenically unsaturated monomer which is copolymerizable with the monomer (A) and has a hydrophobic group or a group having small hydrophilicity can be used in the invention.

Examples of such ethylenically unsaturated monomer (B) include:
i'. olefins, such as ethylene and butene;
ii'. styrene and its derivatives, such as $\alpha$-methylstyrene, o-, m-, or p-methyl styrene, and dimethyl styrene;
iii'. alkyl esters of unsaturated carboxylic acids, such as methyl acrylate, ethyl acrylate, propyl acrylate, methyl methacrylate, ethyl methacrylate, propyl methacrylate, and butyl methacrylate;

iv'. vinyl halides, such as vinyl chloride, vinyldene chloride, and vinyl fluoride;

v'. vinyl esters, such as vinyl acetate, vinyl formate, and vinyl propionate;

vi'. other vinyl compounds, such as acrylonitrile and methacrylonitrile.

These monomers (A) and (B) are used either alone or as an admixture of two or more. Examples of copolymers obtained from suitable monomer combinations include: methacrylic acid/styrene copolymer, acrylic acid/styrene copolymer, methacrylic acid/methyl methacrylate copolymer, acrylic acid/methyl methacrylate/butyl acrylate copolymer, vinyl pyrrolidone/-styrene/methyl methacrylate copolymer, acrylic acid/-vinyl acetate/acrylonitrile/butyl acrylate copolymer, acrylic acid/styrene/acrylonitrile/butyl acrylate copolymer, β-hydroxyethyl methacrylate/maleic anhydride/-methyl methacrylate copolymer, methacrylic acid/N-methylol acrylamide/methyl methacrylate copolymer, acrylic acid/N,N-dimethylaminoethyl methacrylate/styrene copolymer, acrylic acid/acrylamide/styrene copolymer, or a hydrolysis product of vinyl acetate/styrene copolymer.

Copolymers which will swell on contact with water are usable in the invention, but those soluble in water are not suited for the objects of the present invention. Hence, it is desired that the hydrophilicity of the copolymer in the invention should be such that a coating layer of a copolymer on the surface of a substrate film is wetted with water without repelling it on contact.

It is preferred that the copolymer used in the present invention should contain generally 2 to 85 mol percent, particularly 10 to 75 mol percent, of units derived from an ethylenically unsaturated monomer (A) having a hydrophilic group, based on the total weight of the copolymer. It is important that the copolymer should be substantially linear so as to be soluble in an organic solvent, and have a molecular weight sufficient to form a film.

Furthermore, it is important that the copolymer should exhibit good coating efficiency on the substrate film. Thus, the copolymer should preferably have a molecular weight such that its 2 – 50 wt. percent solution in a solvent have a viscosity at 25° C. of at least 50 centipoises, preferably 100 to 50,000 centipoises.

The substrate film on which a coating layer of the above-described copolymer is formed may be any known synthetic resin film such as those obtained from polyolefins, e.g. polyethylene or polypropylene, vinyl polymers, e.g. polystyrene, polyvinyl chloride or polyvinylidene chloride, and condensation polymers such as polyesters, polyamides and polycarbonates. Of these, films of polymers having a strongly polar functional group such as polyesters, polyamides or polycarbonates are used with good results since they have especially good adhesion with the coating layer. These films may either be stretched or unstretched. If the coating treatment of the present invention is operated on a stretched film as the substrate film, the substrate film itself is not impaired and retains its characteristic in the coated film. Foamed films or films containing plasticizers or pigments can also be used without disadvantages. Where a polyolefin film is used, the film should preferably be surface-treated by electric discharge or flame in order to improve the adhesion between the substrate film and the coating layer. The thickness of the substrate film is not particularly restricted, and may vary from 10 to 200μ according to the end uses.

The copolymer solution to be coated on the substrate film in the present invention is obtained by dissolving the copolymer described hereinabove in a solvent to be described hereinafter. The solvent should be compatible with water to an extent such that it is miscible with water or soluble in water to some extent, and be capable of dissolving the copolymer substantially uniformly. Solvents which swell the substrate film to an extent such as not to degenerate the substrate film may be used, but those which dissolve the substrate film cannot be used. Furthermore, the solvents should desirably have sufficiently high volatility at temperatures below a point at which the substrate film is degenerated.

The organic solvents used in the present invention should desirably have a solubility in water at 25° C. of at least 5 percent. Hydrocarbons such as toluene and benzene are not useful in the present invention since a solution of the copolymer in such solvent does not lead to the whitening of the coated copolymer by the drying treatment. The solvents which have the properties mentioned above may be used either alone or in admixture.

Specific examples of the solvent that can be used with good result in the present invention include methanol, ethanol, n-propanol, n-butanol, ethylene glycol monomethyl or ethyl ether, p-dioxane, tetrahydrofuran, acetone, methyl ethyl ketone, cyclohexanone, methyl acetate, and ethyl acetate. The solvent may be selected according to the type of the substrate film or the composition of the copolymer. Of these, acetone, methyl ethyl ketone, p-dioxane, tetrahydrofuran, ethylene glycol monomethyl ether, acetone/methanol mixture, methyl ethyl ketone/methanol mixture, and acetone/methyl ethyl ketone mixture are especially preferred solvents. The amount of the solvent to be used is such that the concentration of the copolymer in the final copolymer solution is 2 to 50 percent by weight, preferably 7 to 50 percent by weight.

The copolymer solution used in the invention is obtained by dissolving the aforementioned copolymer in the solvent described. If the copolymerization of a monomeric mixture is performed in the aforementioned solvent, the product can be directly used as the copolymer solution. When the copolymerization is conducted in a solvent other than those mentioned above, the solvent may be exchanged with the above-mentioned solvent to form the desired solution to be coated on the surface of the substrate film.

It is desirable that according to the type of the substrate film used in the present invention, a proper copolymer solution is used. Examples of the preferred combinations of the substrate film and the coating copolymer are given below.

Films of polyesters or polyamides with a styrene/acrylic acid copolymer, a styrene/acrylic acid/butyl acrylate copolymer, a styrene/acrylic acid/ethyl acrylate copolymer, and a methyl methacrylate/methacrylic acid copolymer;

Films of polyvinyl chloride with a vinyl acetate/acrylonitrile/butyl acrylate/acrylic acid copolymer, and a styrene/acrylonitrile/butyl acrylate/acrylic acid copolymer;

Films of polystyrene with a methyl methacrylate/butyl acrylate/acrylic acid copolymer, and a methyl methacrylate/ethyl acrylate/acrylic acid copolymer.

Where the substrate film used is of poor adhesiveness, a copolymer having a relatively large adhesiveness is chosen from the aforementioned copolymers and coated on the film substrate as an undercoat, and then a copolymer having large tendency to whitening is applied to the undercoat. For example, when a polystyrene film is used as the substrate, a solution of a methyl methacrylate/butyl acrylate/acrylic acid (30–60:-40–60:5–30) copolymer is first coated thereon, and a solution of a methyl methacrylate/butyl acrylate/acrylic acid (65–90:5–30:5–15) copolymer is then coated on top of the undercoat. By this procedure, a coating layer of a high degree of whitening and good adhesion with the substrate film can be formed.

If desired, the copolymer solution may contain white pigments such as titanium oxide, delusterants such as clay or colloidal silica, perfumes, stabilizers, or plasticizers.

The application of the copolymer solution to the substrate film may be effected by various conventional methods such as by immersing the film in the solution, casting the solution over the film, or by using a roll coater or knife coater. Such methods may be chosen according to the viscosity of the solution or the object of coating (whether to coat one surface or both surfaces).

The amount of the copolymer used to form the coating layer is not particularly limited, and may be chosen so that the whitening of the coating copolymer on the substrate film will be achieved. Generally, it is preferred that the amount of the copolymer should be 10 to 100 g, especially 20 to 60 g, as the solids content per square meter of the substrate film.

The synthetic resin film on which a solution of the copolymer has been coated is then dried in an atmosphere having a relative humidity of at least 50 percent, preferably at least 65 percent, whereby the coating layer becomes whitened. The temperature that is used in the drying operation needs to be at least 10° C., but below a point at which the substrate film is degenerated.

For whitening the copolymer coating layer on the substrate film, the use of the copolymer of the above-described composition and the specific solvent and the drying in an atmosphere having a relative humidity of at least 50 percent are especially important. Where the relative humidity of the atmosphere in which the drying is done is lower than 50 percent, the effective whitening of the copolymer coating layer cannot be achieved. The atmosphere having a relative humidity of at least 50 percent can be readily formed by using a constant temperature humidity device, or by feeding air having a relative humidity of at least 50 percent into a closed or opened drying zone. In one preferred embodiment of the drying procedure of the invention, the film to be dried is passed through an atmosphere filled with jetted steam. The whitening of the copolymer coating layer can be confirmed by the naked eye observation.

According to the process of the invention, there can be obtained a synthetic paper consisting of a whitened coating layer (2) of a hydrophilic copolymer formed on the surface of a synthetic resin film substrate (1), as shown in the attached drawing.

Various properties of the paper-like synthetic resin film obtained by the present invention have been measured. The paper-like film of the invention shows a degree of whiteness and a degree of non-transparency, measured by a Hunter's Multipurpose Reflectometer, of more than 80 percent. The smoothness measured by a needle indicating type surface roughness tester and a Bekk smoothness tester is superior to that of high quality paper and art paper. The IGT pick resistance measured by an IGT printability tester and the pine wax testing value show high surface strength, and a good adhesion between the substrate film and the coating layer. The K & N ink testing method shows that the paper-like film obtained in the present invention has good ink receptivity. The results of the ink setting test are also good. These properties indicate a good printability. Observation by an electron microscope shows that the coating layer is of fine and porous structure and therefore is excellent in adhesion and adsorption of various inks such as printing inks and aqueous inks. The paper-like film is also good in graphic properties with a ball-point pen or pencil. The paper-like film obtained in the invention has a lower surface electric resistance than the conventional synthetic paper, and the charging property is reduced. This is considered due to the presence of a hydrophilic group in the copolymer molecule. The appearance and feel of the paper-like film of the invention are the same as the conventional pulp paper. Hence, the paper-like synthetic resin film obtained by the present invention is useful as a substitute of pulp paper. When the paper-like synthetic resin film having these properties is subjected to super calendering, its surface strength or smoothness is elevated, and its pulp-paper-like feel increases. Thus, it is desirable to subject the resulting paper-like film to calendering treatment.

The properties of the paper-like film obtained by the process of the invention have been determined by the following methods.

Degree of Whiteness

Method according to JIS P 8123 using Hunter's Multipurpose Reflectometer with a blue filter for a dominant wavelength 457 m$\mu$. Angle of incoming light 45°.

Degree of Non-transparency

Method according to JIS P 8138 using Hunter's Multipurpose Reflectometer with a green filter. A white standard plate (green filter refractive index 89 percent) and a black standard plate (green filter refractive index below 0.5 percent) is used. Angle of incoming light 45°.

Gloss

Using Glossmeter GM-3 (Murakami Shikisai Gijyutsu Kenkyusho). Specular gloss angle of 60°.

Smoothness

Using Yamamoto-type needle-indicating surface roughness tester. A diameter of needle 10 $\mu$, measuring pressure 0.2 g, feed speed 2 mm/min. Surface roughness is indicated on a printing paper as a sectional state of the surface of a measured piece, being magnified 2,000 times in a vertical direction and 25 times in a transverse direction.

Smoothness

Using improved type of Bekk Smoothness Tester. The measured value are expressed in Bekk values.

IGT Pick Resistance

Using IGT Printability Tester at 20° C and relative humidity of 65 percent. Pick test oil M-viscosity, printing pressure 35 kg/m$^2$, spring drive A.

Surface Strength

Simplified method of ASTM D-1465-57T using pine wax (product of Arakawa Rinsan Co., Ltd., Japan) (JIS P 8129).

Ink Receptivity

K & N Ink Receptivity Testing Method developed by K & N Ink Laboratories Inc. This method is standardized in Tappi RC No. 19. A K & N testing ink (product of Dainippon Ink and Chemicals Company, Japan) is coated on a standard paper, and wiped away after 3 minutes. A ratio of reduction in whiteness is indicated by $W_1 - W_2/W_1 \times 100$ where the original whiteness is $W_1$ and the whiteness after wiping of ink is $W_2$.

Ink Setting Property

Using RI printability tester (product of Akira Seisakusho, Japan). An ink-setting ink (product of Toyo Ink Manufacturing Co., Ltd., Japan; Tradename: Speed King H-4301-1149 97C Black) is coated on the tester in an amount of 0.6 mm³. After kneading for 3 minutes, the ink is coated all over paper. After a certain period of time (2, 4, and 6 minutes), the ink is transferred to standard paper, and the amount of the ink transferred is expressed in L value indicated by Hunter's mode using a color difference meter.

Example 1

40 parts of a styrene/acrylic acid copolymer containing 40 mol percent of acrylic acid were dissolved in 80 parts of acetone. The resulting copolymer solution had a viscosity of 900 centipoises. A polypropylene film of a thickness of $25\mu$ which had been biaxially stretched and the surface of which had been subjected to an oxidizing treatment was immersed in the copolymer solution, and then dried in an atmosphere at 26° C. and a relative humidity of 55 percent. Within 30 seconds, a white coating layer was formed. The amount of the copolymer used for forming the coating layer corresponded to 30 g per square meter of one surface of the film. The paper-like film obtained had an average coating thickness of about $32\mu$, a degree of whiteness of 85 percent, a degree of non-transparency of 92 percent, a gloss of 24 percent, a smoothness, in terms of Bekk value, of 4,500 seconds, an IGT pick resistance of average 250 cm/sec., and a surface strength (by pine wax) of 10 A. It also had an ink receptivity of 54 percent, and ink setting properties as shown in the following table.

| Drying time | *<br>0 minute | after<br>2 minutes | after<br>4 minutes | after<br>6 minutes |
|---|---|---|---|---|
| L value | 94.0 | 71.9 | 83.6 | 88.2 |

* The value for the drying time of 0 minute is an L value of standard paper before transfer of ink. The ink setting property of the specimen is better as its L value is nearer to the L value for the drying time of 0 minute.

Comparative Example 1

40 parts of the copolymer same as that used in Example 1 were dissolved in 80 parts of a mixed solvent consisting of toluene and benzene in a 2:1 weight ratio. A biaxially stretched polypropylene film of a thickness of $25\mu$ was immersed in the resulting copolymer solution, and dried under the same conditions as set forth in Example 1. The coating layer was not whitened even after a lapse of 10 minutes, and the film remained transparent.

Example 2

25 parts of methacrylic acid and 20 parts of methyl methacrylate were dissolved in 70 parts of p-dioxane, and the solution was polymerized with the addition of 0.3 part of benzoyl peroxide. The copolymer solution had a viscosity of 450 centipoises. A biaxially stretched polyethyleneterephthalate film of a thickness of $80\mu$ was immersed in the copolymer solution, and then dried in a constant temperature-humidity chamber at 60° C. and a relative humidity of 65 percent. The amount of the copolymer used for forming the whitened coating layer was 23 g per square meter of one surface of the film. The resulting paper-like film had an average coating thickness of about $21\mu$, a degree of whiteness of 85 percent, a degree of non-transparency of 91 percent, a gloss of 25 percent, a smoothness, measured by a needle-indicating surface roughness tester, of 1 to $1.5\mu$, an IGT pick resistance of about 350 cm/sec., and a surface strength (by pine wax) of 13 A. It had an ink receptivity of 48 percent, and the following ink setting properties.

| | Ink set | | | |
|---|---|---|---|---|
| Drying time | 0 minute | after<br>2 minutes | after<br>4 minutes | after<br>6 minutes |
| L value | 94.0 | 53.1 | 62.4 | 73.8 |

Example 3

30 parts of a styrene/methacrylic acid copolymer containing 15 mol percent of methacrylic acid units were dissolved in 55 parts of ethylene glycol monomethyl ether. The resulting copolymer solution had a viscosity of 1,200 centiposes. A biaxially stretched polyhexamethyleneadipamide film of a thickness of $28\mu$ was immersed in the solution, and then dried in an atmosphere at 80° C. and a relative humidity of 70 percent. The whitening of the coating layer occurred within 30 seconds. The amount of the copolymer used to form the whitened coating layer was 34 g per square meter of one surface of the film.

The resulting paper-like film had an average coating thickness of $32\mu$, a degree of whiteness of 80 percent, a degree of non-transparency of 81 percent, a gloss of 18 percent, a Bekk smoothness of 2,900 seconds, an IGT pick resistance of average 345 cm/sec, and a surface strength (by pine wax) of 13 A. It had an ink receptivity of 60 percent, and the following ink setting properties.

| | Ink set | | | |
|---|---|---|---|---|
| Drying time | 0 minute | after<br>2 minutes | after<br>4 minutes | after<br>6 minutes |
| L value | 94.0 | 80.0 | 84.9 | 89.1 |

Example 4

A copolymer obtained by polymerizing an equimolar mixture of vinyl acetate and styrene was hydrolyzed with an aqueous alkali solution. Twenty-five parts of the resulting copolymer of styrene and vinyl alcohol were dissolved in 80 parts of a mixed solvent of methanol and benzene which contained 60 percent by weight of methanol. The resulting copolymer solution had a viscosity of 250 centipoises. A polyethylene film of a thickness of 35μ which had been biaxially stretched and surface-treated was immersed in the resulting solution, and then dried in an atmosphere at 60° C. and a relative humidity of 70 percent. Within one minute, a white coating layer was formed. The amount of the copolymer used to form the whitened coating layer was 25 g per square meter of one surface of the film. The resulting paper-like film had an average coating thickness of 25μ, a degree of whiteness of 80 percent, a degree of non-transparency of 87 percent, a gloss of 22 percent, a Bekk smoothness of 5,300 seconds, an IGT pick resistance of average 280 cm/sec., and a surface strength (by pine wax) of 10A. It had an ink receptivity of 51 percent, and the following ink setting properties.

| Drying time | 0 minute | Ink set after 2 minutes | after 4 minutes | after 6 minutes |
|---|---|---|---|---|
| L value | 94.0 | 59.0 | 72.5 | 88.1 |

Example 5

50 parts of a copolymer obtained from a monomeric mixture consisting of 10 mole percent of styrene, 60 mole percent of methyl methacrylate and 30 mole percent of vinyl pyrrolidone were dissolved in 60 parts of a mixed solvent consisting of acetone, methanol and chloroform in a weight ratio of 20:45:35. The resulting copolymer solution had a viscosity of 5,400 centiposes. The solution was coated on a polystyrene film of a thickness of 40μ by means of a wire rod, and the film was dried in an atmosphere of 60° C. and a relative humidity of 60 percent. Within 30 seconds, a white coating layer was formed. The amount of the copolymer used to form the whitened coating layer was 40 g per square meter of one surface of the film.

The resulting paper-like film had an average coating thickness of about 41μ, a degree of whiteness of 85 percent, a degree of non-transparency of 94 percent, a gloss of 34 percent, a smoothness, measured by a needle-indicating surface roughness tester, of 2–3μ, an IGT pick resistance of about 280 cm/sec., and a surface strength (by pine wax) of 11A. It had an ink receptivity of 62 percent, and the following ink setting properties.

| Drying time | 0 minute | Ink set after 2 minutes | after 4 minutes | after 6 minutes |
|---|---|---|---|---|
| L value | 94.0 | 83.3 | 87.6 | 90.1 |

Example 6

50 parts of a copolymer obtained by polymerizing a monomeric mixture consisting of 30 mole percent of methyl methacrylate, 20 mole percent of maleic anhydride and 50 mole percent of 2-hydroxyethyl methacrylate were dissolved in 80 parts of a mixed solvent consisting of tetrahydrofuran and methanol in a weight ratio of 55:45. The resulting copolymer solution had a viscosity of 120 centipoises. A biaxially stretched poly-2,2-propane-bis(4-phenylcarbonate) film of a thickness of 60μ was immersed in the copolymer solution, and then dried in an atmosphere at 40° C. and a relative humidity of 90 percent. Within 1 minute, the whitening of the coating layer occurred. The amount of the copolymer used to form the whitened coating layer was 15 g per square meter of one surface of the film. The resulting paper-like film had an average coating thickness of about 16μ, a degree of whiteness of 84 percent, a degree of non-transparency of 87 percent, a gloss of 27 percent, a smoothness, measured by a needle-indicating surface roughness tester, of 1–1.5μ, an IGT pick resistance of average 320 cm/sec., and a surface strength (by pine wax) of 12A. It had an ink receptivity of 47 percent, and the following ink setting properties.

| Drying time | 0 minute | Ink set after 2 minutes | after 4 minutes | after 6 minutes |
|---|---|---|---|---|
| L value | 94.0 | 45.8 | 52.0 | 63.4 |

Example 7

40 parts of a copolymer of 30 mole percent methacrylic acid, 35 mole percent N-methylol acrylamide, and 35 mol percent methyl methacrylute were dissolved in 45 parts of a mixed solvent consisting of equal amounts of methyl ethyl ketone and methanol. The resulting copolymer solution had a viscosity of 8,900 centipoises. The solution was coated on a biaxially stretched polyhexamethyleneadipamide film of a thickness of 28μ by means of a blade coater, and then the film was dried in an atmosphere at 26° C. and a relative humidity of 80 percent.

Within 1 minute, the whitening of the coating layer occurred. The amount of the copolymer used to form the whitened coating layer was 47 g per square meter of one surface of the film.

The resulting paper-like film had an average coating thickness of about 45μ, a degree of whiteness of 89 percent, a degree of non-transparency of 92 percent, a gloss of 30 percent, a Bekk smoothness of 9,000 seconds, an IGT pick resistance of 270 cm/sec., and a surface strength of 10A. It had an ink receptivity of 50 percent and the following ink setting properties.

| Drying time | 0 minute | Ink set after 2 minutes | after 4 minutes | after 6 minutes |
|---|---|---|---|---|
| L value | 94.0 | 55.5 | 58.4 | 72.0 |

Example 8

30 parts of a copolymer obtained by copolymerizing a monomeric mixture consisting of 60 mol percent styrene, 10 mole percent N,N-dimethyl-aminoethyl methacrylate and 30 mole percent acrylic acid were dissolved in 150 parts of p-dioxane. The resulting copolymer solution had a viscosity of 90 centipoises. A biaxially stretched polyvinyl chloride film of a thickness of 55μ was immersed in the copolymer solution so obtained, and then dried in an atmosphere at 40° C. and a relative humidity of 65 percent. Within 1 minute, a white coating layer was formed. The amount of the copolymer used to form the whitened coating layer was 10 g per square meter of one surface of the film.

The resulting paper-like film had an average coating thickness of about 15μ, a degree of whiteness of 81 percent, a degree of non-transparency of 85 percent, a gloss of 26 percent, a Bekk smoothness of 900 seconds, an IGT pick resistance of 280 cm/sec., and a surface strength of 11A. It had an ink receptivity of 70 percent, and the following ink setting properties.

| Drying time | 0 minute | Ink set after 2 minutes | after 4 minutes | after 6 minutes |
| --- | --- | --- | --- | --- |
| L value | 94.0 | 92.7 | 93.7 | 93.7 |

Example 9

25 parts of a copolymer obtained by radical polymerization of a monomeric mixture consisting of 75 mole percent methyl methacrylate, 15 mole percent butyl acrylate and 10 mole percent acrylic acid were dissolved in 75 parts of a mixed solvent consisting of equal amounts of p-dioxane and ethylene glycol monomethyl ether. The resulting copolymer solution had a viscosity of 430 centipoises. A biaxially stretched polystyrene film of a thickness of 40μ was continuously immersed in the copolymer solution. The film was then continuously passed through a drying chamber maintained at 45° C. and a relative humidity of 92 percent by jetting steam intermittently, so that the film stayed in the chamber for 40 seconds. The dried film having formed thereon a whitened coating layer was wound up on a roll. The amount of the copolymer coated on the film was about 80 g/m².

The resulting paper-like film had an average coating thickness of about 40μ, a degree of whiteness of 92 percent, a degree of non-transparency of 96 percent, a gloss of 38 percent, a Bekk smoothness of 5,000 seconds, an IGT pick resistance of average 280 cm/sec., and a surface strength of 14A. It had an ink receptivity of 60 percent, and an ink setting property (L value) of 82 for the 2-minute drying time, 88.3 for the 4-minute drying time, and 93.0 for the 6-minute drying time. This indicates superior ink-receptivity and ink drying property.

Comparative Example 2

25 parts of a copolymer obtained by polymerizing a monomeric mixture consisting of 5 mole percent of methyl methacrylate, 30 mole percent of butyl acrylate and 65 mole percent of acrylic acid were dissolved in 75 parts of a mixed solvent same as that used in Example 9. A biaxially stretched polystyrene film of a thickness of 40μ was immersed in the copolymer solution, and then dried in a constant temperature-humidity chamber maintained at 45° C. and a relative humidity of 92 percent in the same way as set forth in Example 9. Within the first 1 minute, the coating layer became slightly white, but after the completion of the drying, the coated film was transparent. The above-mentioned copolymer was readily soluble in warm water.

Example 10

35 parts of a copolymer obtained by copolymerizing a monomeric mixture consisting of 50 mole percent vinyl acetate, 20 mole percent acrylonitrile, 20 mole percent butyl methacrylate and 10 mole percent methacrylic acid were dissolved in 65 parts of a mixed solvent consisting of equal amounts of methyl ethyl ketone and ethylene glycol monomethyl ether. The resulting copolymer solution having a viscosity of 1,300 centipoises was coated on both surfaces of a biaxially stretched polyvinyl chloride film of a thickness of 55μ using a wire rod, and the film was then dried in a constant temperature-humidity chamber maintained at 50° C. and a relative humidity of 87 percent. Within 2 minutes, a whitened coating layer was formed.

The resulting paper-like film had an average coating thickness of about 50μ, and the amount of the copolymer coated on the film was 105 g/m². The film had a degree of whiteness of 89 percent, a degree of non-transparency of 92 percent, a gloss of 24 percent, a smoothness, measured by a needleindicating surface roughness tester, of 3–4μ, an IGT pick resistance of average 250 cm/sec., a surface strength of 11A, an ink receptivity of 50 percent, and an ink setting property (L value) of 64.0 for the 2-minute drying time, 70.3 for the 4-minute drying time, and 87.5 for the 6-minute drying time.

Comparative Example 3

A film coated with the copolymer solution obtained in Example 10 was dried in a constant temperature-humidity chamber maintained at 50° C. and a relative humidity of 40 percent. The coating layer was not whitened, and the resulting film was transparent.

What we claim is:

1. A process for producing a paper-like film, which comprises dissolving a copolymer selected from the group consisting of methacrylic acid-styrene, acrylic acid-styrene, methacrylic acid-methyl methacrylate, acrylic acid-methyl methacrylate-butyl acrylate, vinyl pyrrolidone-styrene-methyl methacrylate, acrylic acid-vinyl acetate-acrylonitrile-butyl acrylate, acrylic acid-styrene-acrylonitrile-butyl acrylate, β-hydroxyethyl methacrylate-maleic anhydride-methyl methacrylate, methacrylic acid-N-methylol acrylamide-methyl methacrylate, acrylic acid-N,N-dimethylaminoethyl methacrylate-styrene and acrylic acid-acrylamide-styrene copolymers or a hydrolysis product of vinyl acetate-styrene copolymer in a solvent which is at least one member selected from the group consisting of methanol, ethanol, n-propanol, n-butanol, ethylene glycol monomethyl ether, ethylene glycol monoethyl ether, dioxane, tetrahydrofuran, acetone, methyl ethyl ketone, cyclohexanone, methyl acetate and ethyl acetate, the concentration of copolymer in the resulting solution being 7–50 percent by weight, coating the resulting solution on a synthetic resin substrate film and drying the coated synthetic resin film in an atmosphere having a temperature of at least 10° C and a relative humidity of at least 50 percent, thereby whitening said copolymer.

2. The process of claim 1, wherein said copolymer has a molecular weight sufficient for fabrication into films.

3. The process of claim 1, wherein a solution of the copolymer is coated on the surface of the synthetic resin film in an amount of the copolymer of 10 to 100 g, calculated as the solid content, per square meter of the surface of the substrate film.

4. The process of claim 1, wherein the synthetic resin film is selected from the group consisting of a polyester film, a polyamide film and a polycarbonate film.

5. The process of claim 1, wherein the synthetic resin film is a polyolefin film.

6. The process of claim 1, wherein the synthetic resin film is a polystyrene film.

7. The process of claim 1, wherein the synthetic resin film is a polyvinyl chloride film.

8. The process of claim 1, wherein the synthetic resin film is a polyester or polyamide film, and said copolymer is selected from the group consisting of a styrene/acrylic acid copolymer, and a methyl methacrylate/methacrylic acid copolymer.

9. The process of claim 1, wherein the synthetic resin film is a polyvinyl chloride film, and said copolymer is a vinyl acetate/acrylonitrile/butyl acrylate/acrylic acid copolymer or a styrene/acrylonitrile/butyl acrylate/acrylic acid copolymer.

10. The process of claim 1, wherein the synthetic resin film is a polystyrene film, and said copolymer is a methyl methacrylate/butyl acrylate/acrylic acid copolymer.

* * * * *